United States Patent
Stover et al.

(10) Patent No.: US 11,697,760 B2
(45) Date of Patent: Jul. 11, 2023

(54) SYSTEM AND METHOD FOR UTILIZING OOLITIC ARAGONITE AS A PROPPANT IN HYDRAULIC FRACKING

(71) Applicant: Pisa Carolina, LLC, Fairfield, NC (US)

(72) Inventors: James Duane Stover, Gloucester, VA (US); Jayson Alexander Meyers, Palm Beach Gardens, FL (US)

(73) Assignee: Pisa Carolina, LLC, Fairfield, NC (US)

( * ) Notice: Subject to any disclaimer, the term of this patent is extended or adjusted under 35 U.S.C. 154(b) by 0 days.

(21) Appl. No.: 17/582,829

(22) Filed: Jan. 24, 2022

(65) Prior Publication Data

US 2022/0235261 A1    Jul. 28, 2022

Related U.S. Application Data

(60) Provisional application No. 63/141,188, filed on Jan. 25, 2021.

(51) Int. Cl.
*C09K 8/80* (2006.01)
*E21B 43/267* (2006.01)

(52) U.S. Cl.
CPC .............. *C09K 8/80* (2013.01); *E21B 43/267* (2013.01)

(58) Field of Classification Search
None
See application file for complete search history.

(56) References Cited

U.S. PATENT DOCUMENTS

| | | | |
|---|---|---|---|
| 8,424,784 B1 | 4/2013 | Munisteri | |
| 2011/0259585 A1 | 10/2011 | Banerjee et al. | |
| 2014/0054039 A1* | 2/2014 | Chang | C09K 8/885 166/292 |
| 2015/0101815 A1* | 4/2015 | Soane | E21B 43/2406 166/305.1 |
| 2017/0350222 A1 | 12/2017 | Gullickson et al. | |
| 2018/0320498 A1* | 11/2018 | Nguyen | C09K 8/40 |
| 2020/0040708 A1 | 2/2020 | Badazhkov et al. | |
| 2020/0048532 A1 | 2/2020 | Vigderman et al. | |

OTHER PUBLICATIONS

Calcean Minerals & Materials LLC; "What is Oolitic Aragonite?"; <https://www.calcean.com/blog/2019/9/16/what-is-oolitic-aragonite>; published Sep. 16, 2019; accessed Sep. 8, 2022. (Year: 2019).*

International search report for International application No. PCT/USD 22/13644, dated Apr. 8, 2022.

\* cited by examiner

*Primary Examiner* — Andrew Sue-Ako
(74) *Attorney, Agent, or Firm* — Quinn IP Law

(57) ABSTRACT

A system for utilizing oolitic aragonite as a proppant in hydraulic fracking is provided. The system includes a proppant storage tank including a stockpile of the oolitic aragonite. The system further includes a proppant pumping unit operable to pump the oolitic aragonite from the proppant storage tank, through an underground shaft, and into an underground fracture proximate to the underground shaft.

18 Claims, 2 Drawing Sheets

SYSTEM AND METHOD FOR UTILIZING OOLITIC ARAGONITE AS A PROPPANT IN HYDRAULIC FRACKING

CROSS-REFERENCE TO RELATED APPLICATIONS

This disclosure claims priority to Provisional Patent Application No. 63/141,188 filed on Jan. 25, 2021, which is hereby incorporated by reference.

INTRODUCTION

The disclosure generally relates to a system and method for utilizing oolitic aragonite as a proppant in hydraulic fracking.

BACKGROUND

Hydraulic fracturing or hydraulic fracking is a method by which increased amounts of products such as petroleum may be pumped out of an underground well. A proppant is a material that is pumped into an underground well that is used to keep a fracture created in the rock open.

SUMMARY

A proppant as disclosed herein benefits from high roundness, sphericity, and porosity.

A system for utilizing oolitic aragonite as a proppant in hydraulic fracking is provided. The system includes a proppant storage tank including a stockpile of the oolitic aragonite, a nozzle configured to deliver the oolitic aragonite into a fracture within an underground mining operation, and a proppant pumping unit operable to pump the oolitic aragonite from the proppant storage tank to the nozzle.

In some embodiments, the nozzle includes an articulable nozzle including robotic control features.

In some embodiments, the oolitic aragonite includes particles with a threshold roundness.

In some embodiments, the threshold roundness is 0.9 according to Krumbein Shape Factors as tested per API STD-19C.

In some embodiments, the oolitic aragonite includes particles with a threshold sphericity.

In some embodiments, the threshold sphericity is 0.8 according to Krumbein Shape Factors as tested per API STD-19C.

In some embodiments, the oolitic aragonite includes particles with a threshold porosity.

In some embodiments, the oolitic aragonite includes particles with a particle size of 30 mesh to 50 mesh.

In some embodiments, the oolitic aragonite includes particles with a particle size of 40 mesh to 70 mesh.

In some embodiments, the oolitic aragonite includes particles with a particle size of less than 100 mesh.

According to one alternative embodiment, a method for utilizing oolitic aragonite as a proppant in hydraulic fracking is provided. The method includes, within an underground horizontal shaft of an underground mining operation, providing a flow of high-pressure water configured creating fractures in walls of the underground horizontal shaft and providing with the flow of the high-pressure water a proppant including oolitic aragonite, wherein the proppant is provided into the fractures.

In some embodiments, the method further includes ceasing the flow of the high-pressure water and harvesting petroleum products from the underground horizontal shaft.

According to one alternative embodiment, a method for utilizing oolitic aragonite as a proppant in hydraulic fracking includes identifying, within an underground mining operation, a fracture attaching a first underground chamber and a second underground chamber, maneuvering a nozzle operable to deposit oolitic aragonite within or proximate to the fracture, and pumping a proppant deposit including the oolitic aragonite within the fracture.

In some embodiments, the oolitic aragonite includes particles with a threshold roundness.

In some embodiments, the oolitic aragonite includes particles with a threshold sphericity.

In some embodiments, the oolitic aragonite includes particles with a threshold porosity.

In some embodiments, the oolitic aragonite includes particles with a particle size of 30 mesh to 50 mesh.

In some embodiments, the oolitic aragonite includes particles with a particle size of 40 mesh to 70 mesh.

In some embodiments, the oolitic aragonite includes particles with a particle size of 100 mesh or smaller.

The above features and advantages and other features and advantages of the present disclosure are readily apparent from the following detailed description of the best modes for carrying out the disclosure when taken in connection with the accompanying drawings.

DETAILED DESCRIPTION

Figure 1:
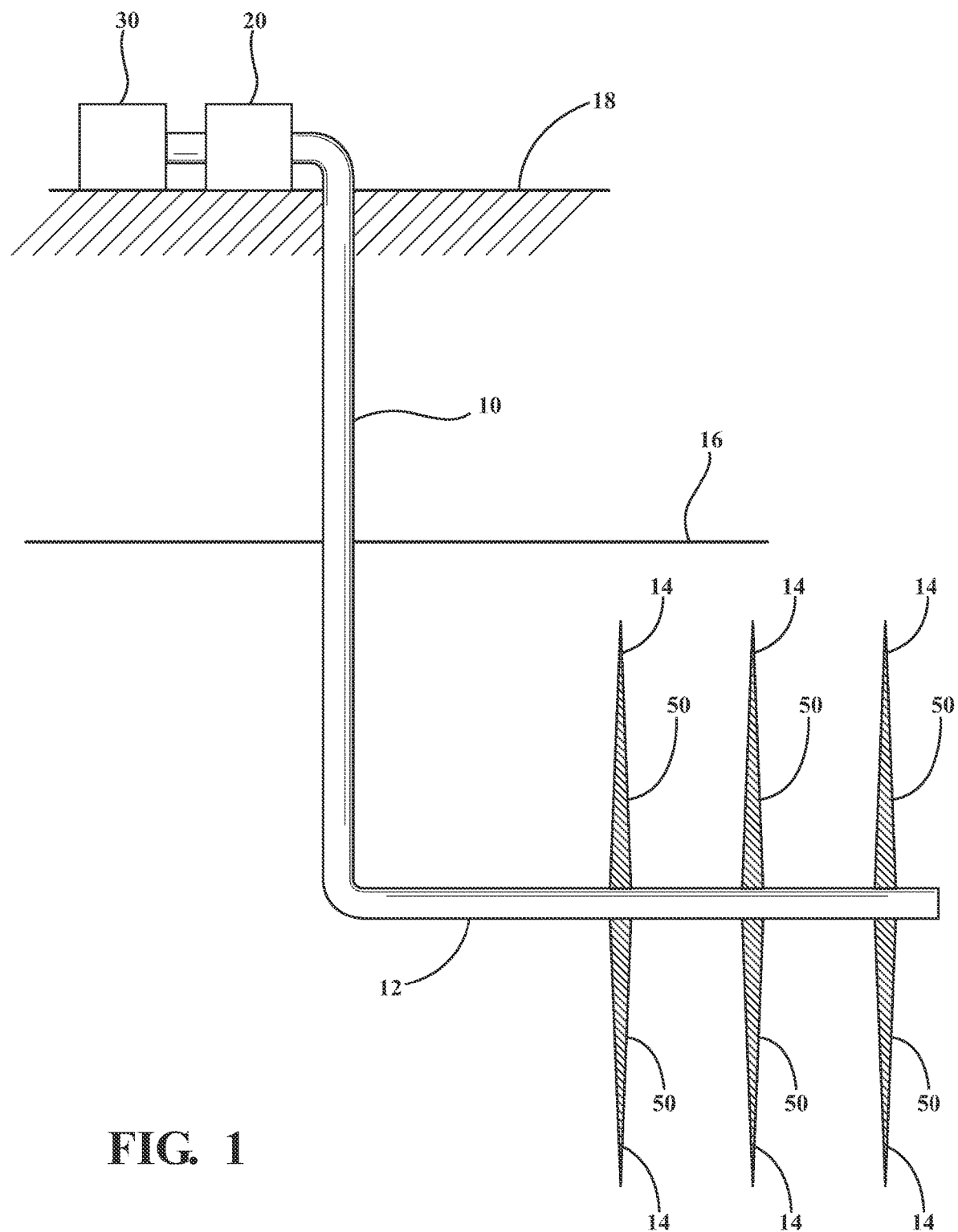
FIG. 1 schematically illustrates a system enabling use of oolitic aragonite as a proppant in hydraulic fracking, in accordance with the present disclosure.

A system and method for use of oolitic aragonite as a proppant in hydraulic fracking is provided. Bahamian oolitic sand is comprised of oolites. Oolites are ovoid or egg-shaped particles that form in agitated shallow-marine waters in tropical settings where the waters include high amounts of calcium bicarbonate. Carbon dioxide is lost to the atmosphere through degassing as a result of agitation, through elevated temperatures from solar radiation, and the activity of photosynthetic organisms. The loss of carbon dioxide allows precipitation of concentric layers of calcium carbonate in the form of microscopic layers of interlocking crystals of aragonite on pre-existing skeletal or pelletoidal nuclei. Oolitic aragonite particles formed in this manner are composed of relatively high purity calcium carbonate with unique physical properties as compared to similar materials in the art.

To utilize aragonite as a proppant for hydraulic fracturing, raw oolitic sands are harvested from the ocean in the Bahamas or other similar marine environments. Processing involves drying and sizing raw sand to segregate oolitic aragonite particles for desired uses and applications. According to one embodiment, a system and method to use oolitic aragonite as a proppant may utilize segregated oolitic aragonite in one of three size ranges: 30 to 50 mesh, 40 to 70 mesh, and 100 mesh or smaller.

According to one embodiment, oolitic aragonite used as a proppant may include a threshold roundness, a threshold sphericity, a threshold permeability, and/or a threshold porosity.

Oolitic aragonite includes particles with relatively high roundness and sphericity. Filtering devices may be utilized to segregate particles with threshold roundness and sphericity. Utilizing oolitic aragonite particles with threshold roundness and sphericity provides a threshold porosity and permeability to permit oil and natural gas to pass through the particles.

Roundness and sphericity may be described or define according to Krumbein Shape Factors/as tested per API STD-19C, wherein a highest possible rating is 0.9. According to one embodiment of the disclosure, oolitic aragonite particles may be segregated, and a portion confirming to roundness=0.9 and sphericity=0.8 may be utilized according to the disclosed method.

Porosity describes how many holes or depressions a particle has upon its surface. A spherical particle with high sphericity and high roundness may exhibit high porosity. Non-porous particles may be damaged by a hydraulic crushing effect—as high pressure from a high-pressure liquid press inwardly on the outer surface of the particle, the particle may be damaged or crushed.

Oolitic aragonite is highly porous, and this porosity reduces a hydraulic crushing effect of high-pressure liquid. High-pressure liquid may enter the particle through the porous openings, and pressure exerted upon the outside of the particle may be partially or fully equalized by the pressure of the liquid on the inside of the particle. High porosity negating effects of hydraulic pressure may be helpful during a process of using high pressure liquid to deposit the proppant within underground fractures. The high porosity may additionally resist high liquid pressures after the deposition process existing within the underground rock formation.

Additionally, when dried, oolitic aragonite particles may form interlocking networks of needle-like crystals, which create a highly porous substrate capable of imbibing chemicals. These chemicals are used for anti-scaling and other methods meant to inhibit precipitation of other minerals on the proppant itself. Other naturally occurring proppants lose crush value in fluid under pressure.

As oolitic particles form, alternating concentric layers of aragonite form and are coated with a protein form called nacre. These alternating concentric layers provide additional strength as the particle increases in size. This is unique as other naturally occurring proppants decrease in crush value as they increase in size. Use of oolitic aragonite as described herein, wholly as oolitic aragonite or mixed in portion with frac sand, as a proppant improves operation of the proppant, enabling better extraction results from the mine over time. Additionally, use of oolitic aragonite as a proppant requires fewer chemicals to be used at the time of fracking, reducing costs and an effect of pumping chemicals into the ground.

FIG. 1 schematically illustrates a system enabling use of oolitic aragonite as a proppant in hydraulic fracking. An underground vertical shaft 10 is illustrated connecting to an underground horizontal shaft 12. The underground horizontal shaft 12 may be drilled in an exemplary shale deposit which FIG. 1 defines as being below rock layer boundary 16. The shale deposit below the rock layer boundary 16 may include a supply of oil, natural gas, or other resources that may be pumped through the underground horizontal shaft 12 and then through underground vertical shaft 10 for use as a consumer/industrial product. One underground horizontal shaft 12 is illustrated connected to the underground vertical shaft 10. More than one underground horizontal shaft 12 may be connected to the same underground vertical shaft 10. Underground shafts may be deep and may run horizontally for long distances. The illustrated shafts of FIG. 1 are intended to convey concepts of the system and process disclosed herein and are not to scale.

Through hydraulic fracking techniques, fractures 14 may be opened in the shale deposit, enabling natural gas and oil within the shale to flow through the fractures 14. The fractures 14 are susceptible to collapse or becoming blocked. A proppant 50 may be provided within the fractures 14 to support the fractures 14 and prevent them from becoming blocked. Material used to create the proppant 50 may be selected based upon properties disclosed herein, such as roundness, sphericity, and porosity. In FIG. 1, the proppant 50 includes oolitic aragonite. In one embodiment, hydraulic fracking and providing the proppant 50 to the fractures 14 that are created may be performed as a single operation, with the disclosed oolitic aragonite being pumped into the underground horizontal shaft 12 with high pressure water useful to create the fractures 14 and optionally additionally including chemicals useful to promote the fracking process. Once the fractures 14 are created and the proppant 50 is provided into the fractures 14, the high pressure water may be deactivated, and the site may be utilized to harvest petroleum products.

The system of FIG. 1 enabling use of oolitic aragonite as the proppant 50 includes a proppant pumping unit 20 and a proppant storage tank 30 providing a supply of oolitic aragonite. The proppant pumping unit 20 and the proppant storage tank 30 may be disposed upon an above ground surface 18. The proppant pumping unit 20 provides pumping pressure and a flow of liquid useful to deliver proppant from the proppant storage tank 30, through the underground vertical shaft 10, through the underground horizontal shaft 12, and into the fractures 14. In one embodiment, the proppant pumping unit 20 may utilize a flow of water to carry particles of the proppant 50 through the system. A number of additional or alternative system components are envisioned, and the disclosure is not intended to be limited to the examples provided herein.

A method for using oolitic aragonite as a proppant in hydraulic fracking is disclosed. The method may include a first step identifying, within an underground mining operation, at least one fracture requiring a proppant to prevent the fracture from closing. A second step may include pumping a proppant deposit including the oolitic aragonite within the fracture.

Figures 2, 3:
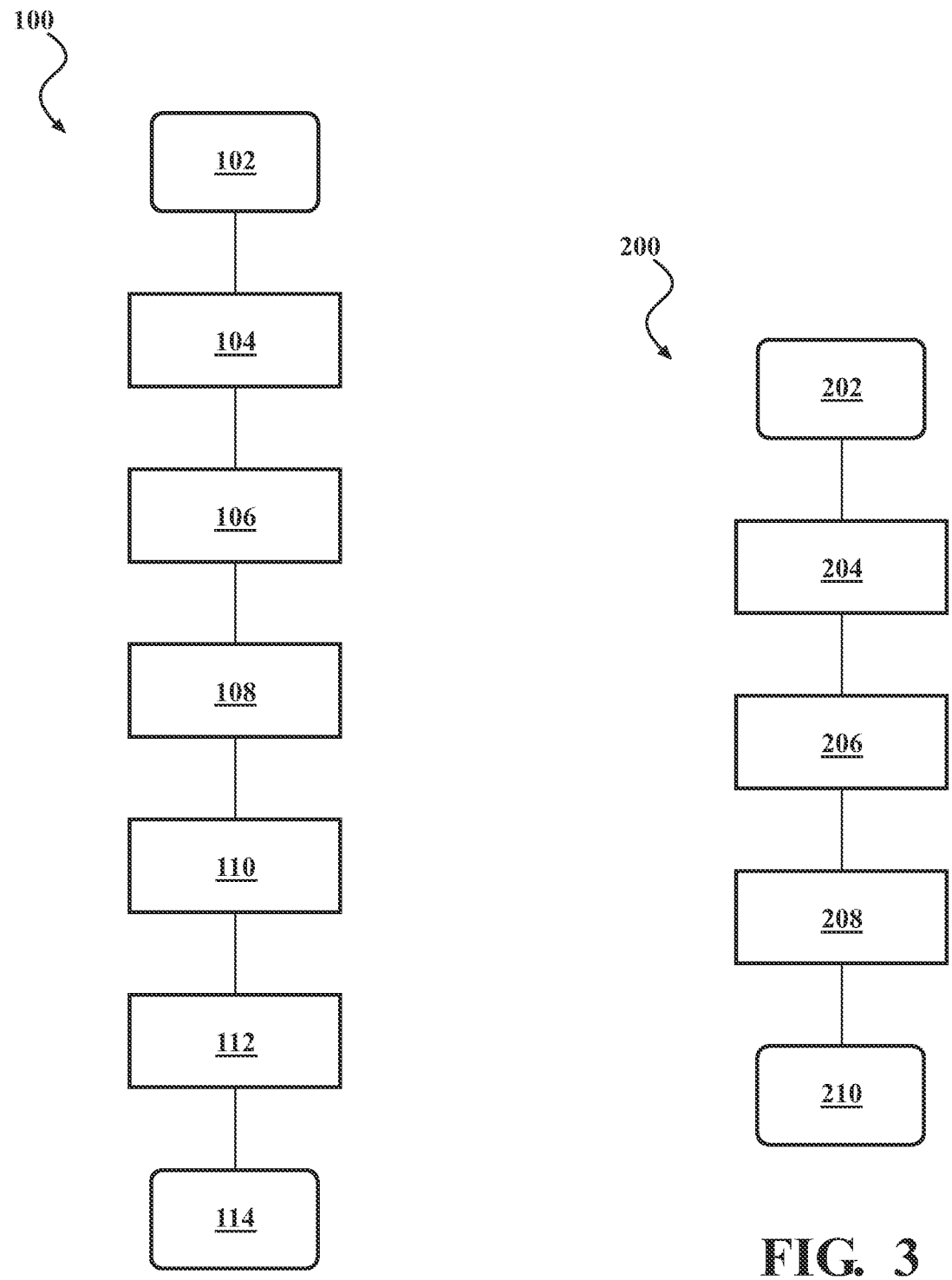
FIG. 2 is a flowchart illustrating a method to utilize oolitic aragonite as a proppant, in accordance with the present disclosure.
FIG. 3 is a flowchart illustrating a method to direct oolitic aragonite as a proppant to an identified fracture, in accordance with the present disclosure.

FIG. 2 is a flowchart illustrating a method 100 to utilize oolitic aragonite as a proppant. The method 100 starts at step 102. At step 104, a drill is utilized to create an underground vertical shaft. At this stage, cement and/or metal piping may be utilized to reinforce side walls of the shaft. At step 106, a drill bit used by the drill is turned to create an underground horizontal shaft. At step 108, high-pressure water, created by an above ground pump device, and oolitic aragonite are pumped into the horizontal shaft. This high-pressure water fractures shale or other rock surrounding the horizontal shaft, causing small fractures or cracks in the rock to form. The oolitic aragonite is forced into the cracks with the high-pressure water. At step 110, the high-pressure water is deactivated. The oolitic aragonite remains within the cracks and acts as a proppant, keeping the cracks upon and allowing petroleum products to flow past the oolitic aragonite. At step 112, the petroleum products are pumped out of the shafts. At step 114, the method 100 ends. A number of additional or alternative method steps are envisioned, and the disclosure is not intended to be limited to the examples provided herein.

Method 100 is a method for providing oolitic aragonite within fractures created within a horizontal shaft, with the oolitic aragonite being provided generally with a flow of high-pressure water. FIG. 3 is a flowchart illustrating a method 200 to utilize a robotic nozzle to provide oolitic aragonite as a proppant in an identified underground fracture. Method 200 starts at step 202. At step 204, a fracture within an underground mining operation, such as within an underground horizontal shaft, is identified as being a candidate for use of a proppant. In one example, a fracture may be identified as attaching a first underground chamber and a second underground chamber, and use of a proppant to prevent the fracture from closing up will be beneficial to a mining operation to harvest petroleum products. At step 206, a nozzle operable to deposit oolitic aragonite within or proximate to the fracture is maneuvered to the identified fracture. At step 208, a pump is utilized to deliver water and the oolitic aragonite into the fracture. At step 210, the method 200 ends. A number of additional or alternative method steps are envisioned, and the disclosure is not intended to be limited to the examples provided herein.

While the best modes for carrying out the disclosure have been described in detail, those familiar with the art to which this disclosure relates will recognize various alternative designs and embodiments for practicing the disclosure within the scope of the appended claims.

What is claimed is:

1. A system for utilizing oolitic aragonite as a proppant in hydraulic fracking, comprising:
   a proppant storage tank including a stockpile of the oolitic aragonite; and
   a proppant pumping unit operable to pump the oolitic aragonite from the proppant storage tank, through an underground shaft, and into an underground fracture proximate to the underground shaft; and
   wherein the oolitic aragonite is configured for forming interlocking networks of needle-like crystals within the underground fracture; and
   wherein the oolitic aragonite is imbibed with anti-scaling chemicals.

2. The system of claim 1, wherein the oolitic aragonite consists of particles with a threshold roundness.

3. The system of claim 2, wherein the threshold roundness is 0.9 according to Krumbein Shape Factors as tested per API STD-19C.

4. The system of claim 1, wherein the oolitic aragonite consists of particles with a threshold sphericity.

5. The system of claim 4, wherein the threshold sphericity is 0.8 according to Krumbein Shape Factors as tested per API STD-19C.

6. The system of claim 1, wherein the oolitic aragonite consists of particles with a threshold porosity.

7. The system of claim 1, wherein the oolitic aragonite consists of particles with a particle size of 30 mesh to 50 mesh.

8. The system of claim 1, wherein the oolitic aragonite consists of particles with a particle size of 40 mesh to 70 mesh.

9. The system of claim 1, wherein the oolitic aragonite consists of particles with a particle size of 100 mesh or smaller.

10. A method for utilizing oolitic aragonite as a proppant in hydraulic fracking, comprising:
    within an underground horizontal shaft of an underground mining operation:
       providing a flow of water configured to create fractures in walls of the underground horizontal shaft; and
       providing with the flow of the water the proppant including the oolitic aragonite, wherein the proppant is provided into the fractures; and
    wherein the oolitic aragonite is configured for forming interlocking networks of needle-like crystals within the underground fracture; and
    wherein the oolitic aragonite is imbibed with anti-scaling chemicals.

11. The method of claim 10, further comprising:
    ceasing the flow of the water; and
    harvesting petroleum products from the underground horizontal shaft.

12. A method for utilizing oolitic aragonite as a proppant in hydraulic fracking, comprising:
    identifying, within an underground mining operation, a fracture attaching a first underground chamber and a second underground chamber;
    maneuvering a nozzle operable to deposit the oolitic aragonite within or proximate to the fracture; and
    pumping a proppant deposit including the oolitic aragonite within the fracture; and
    wherein the oolitic aragonite is configured for forming interlocking networks of needle-like crystals within the underground fracture; and
    wherein the oolitic aragonite is imbibed with anti-scaling chemicals.

13. The method of claim 12, wherein the oolitic aragonite consists of particles with a threshold roundness.

14. The method of claim 12, wherein the oolitic aragonite consists of particles with a threshold sphericity.

15. The method of claim 12, wherein the oolitic aragonite consists of particles with a threshold porosity.

16. The method of claim 12, wherein the oolitic aragonite consists of particles with a particle size of 30 mesh to 50 mesh.

17. The method of claim 12, wherein the oolitic aragonite consists of particles with a particle size of 40 mesh to 70 mesh.

18. The method of claim 12, wherein the oolitic aragonite consists of particles with a particle size of 100 and smaller mesh.

* * * * *